(12) United States Patent
Suzuki et al.

(10) Patent No.: US 11,163,171 B2
(45) Date of Patent: Nov. 2, 2021

(54) POINTER AND INKJET PRINTER INCLUDING POINTER

(71) Applicant: Roland DG Corporation, Hamamatsu (JP)

(72) Inventors: Hironobu Suzuki, Hamamatsu (JP); Masanori Ishihara, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 209 days.

(21) Appl. No.: 16/720,026

(22) Filed: Dec. 19, 2019

(65) Prior Publication Data
US 2020/0209636 A1 Jul. 2, 2020

(30) Foreign Application Priority Data

Dec. 27, 2018 (JP) .............................. JP2018-244595

(51) Int. Cl.
| | |
|---|---|
| *G02B 27/20* | (2006.01) |
| *F21K 9/62* | (2016.01) |
| *F21V 11/08* | (2006.01) |
| *B41J 11/00* | (2006.01) |
| *F21V 11/12* | (2006.01) |

(Continued)

(52) U.S. Cl.
CPC .......... *G02B 27/20* (2013.01); *B41J 11/0095* (2013.01); *F21K 9/62* (2016.08); *F21V 11/08* (2013.01); *B41J 2/442* (2013.01); *B41J 2/45* (2013.01); *B41J 2/451* (2013.01); *B41J 2203/00* (2020.08); *B41J 2203/01* (2020.08); *F21K 9/68* (2016.08); *F21V 7/05* (2013.01); *F21V 11/10* (2013.01); *F21V 11/12* (2013.01); *F21V 11/14* (2013.01)

(58) Field of Classification Search
CPC .......... F21V 11/08; F21V 11/10; F21V 11/12; F21V 11/14; F21V 7/05; F21K 9/62; F21K 9/68; G02B 27/20; B41J 11/0095; B41J 2203/00; B41J 2203/01; B41J 2/442; B41J 2/45; B41J 2/451
See application file for complete search history.

(56) References Cited

U.S. PATENT DOCUMENTS 2,094,670 A * 10/1937 Rambusch .............. F21V 21/30
362/269
3,851,165 A * 11/1974 Beck ....................... F21V 11/08
362/268

(Continued)

FOREIGN PATENT DOCUMENTS

JP      2019101436 A  *  6/2019  ............ F21V 7/0058

*Primary Examiner* — Alexander K Garlen
*Assistant Examiner* — Colin J Cattanach
(74) *Attorney, Agent, or Firm* — Keating & Bennett, LLP

(57) ABSTRACT

A pointer includes a case housing an LED device and including a light emission hole through which light from the device is emitted to an external space, a first plate between the device and the light emission hole and including a first light passage hole that allows passage of the light from the device, and a second plate between the first plate and the light emission hole and including a second light passage hole that allows passage of the light having passed through the first light passage hole. The light passage holes and the light emission hole are located on a central axis of the device. The device and the first and second plates are disposed such that H/2<S<H, where H denotes a distance between the device and the first plate, and S denotes a distance between the first and second plates.

11 Claims, 7 Drawing Sheets

(51) Int. Cl.
*B41J 2/44* (2006.01)
*F21V 7/05* (2006.01)
*B41J 2/45* (2006.01)
*F21V 11/10* (2006.01)
*F21K 9/68* (2016.01)
*F21V 11/14* (2006.01)

(56) References Cited

U.S. PATENT DOCUMENTS

| | | | |
|---|---|---|---|
| 5,343,376 A * | 8/1994 | Huang | G02B 27/20 362/187 |
| 5,444,520 A * | 8/1995 | Murano | B41J 2/465 347/244 |
| 2007/0263683 A1* | 11/2007 | Nakahata | G02B 5/005 372/29.021 |
| 2012/0327164 A1* | 12/2012 | Momoka | H01S 5/02375 347/118 |
| 2019/0277454 A1* | 9/2019 | Kawamura | F21V 31/005 |

* cited by examiner

POINTER AND INKJET PRINTER INCLUDING POINTER

CROSS REFERENCE TO RELATED APPLICATIONS

This application claims the benefit of priority to Japanese Patent Application No. 2018-244595 filed on Dec. 27, 2018. The entire contents of this application are hereby incorporated herein by reference.

BACKGROUND OF THE INVENTION

1. Field of the Invention

The present invention relates to pointers and inkjet printers including pointers.

2. Description of the Related Art

A processing apparatus known in the related art, such as an inkjet printer, includes a bed on which an object to be processed (which will hereinafter be referred to as an "object") is placed. Examples of such an object include a recording medium. In processing the object placed on the bed, the processing apparatus needs to preliminarily check the location of the object. The processing apparatus is provided with a pointer to apply small diameter light to the bed and/or the object. An operator moves, for example, the bed such that the light is applied from the pointer to a positioning reference point defined, for example, on the bed. This enables the processing apparatus to check the location of the object.

Laser light sources are usually used as light sources of pointers. Laser light sources, however, are relatively expensive. Thus, light-emitting diode (LED) devices that are more inexpensive than laser light sources are now finding use as light sources of pointers.

A pointer known in the related art includes an LED device serving as a light source, and a case in which the LED device is housed. The case is provided with a hole through which light from the LED device is emitted to the outside of the case. The light from such a pointer includes direct light and reflected light. The direct light is applied from the LED device directly to the outside of the case without being reflected inside the case. The reflected light is applied from the LED device to the outside of the case after being reflected inside the case. The reflected light will be applied to an area around a target region for direct light application. When the amount of reflected light is relatively large, the outline of the target region for direct light application will unfortunately be unclear due to the reflected light. This makes it difficult to accurately apply the direct light from the pointer to a positioning reference point defined, for example, on the bed.

SUMMARY OF THE INVENTION

Accordingly, preferred embodiments of the present invention provide pointers each being able to make an outline of direct light clearer by reducing an amount of reflected light from an LED device inside a case to an external space.

A pointer according to a preferred embodiment of the present invention includes an LED device, a case, a first plate, and a second plate. The case houses the LED device. The case includes a light emission hole through which light from the LED device is emitted to an external space. The first plate is disposed in the case such that the first plate is located between the LED device and the light emission hole. The first plate divides the case into a first chamber and a second chamber. The first chamber houses the LED device. The second chamber is in communication with the light emission hole. The first plate includes a first light passage hole that allows passage of the light from the LED device. The second plate is disposed in the second chamber such that the second plate is located between the first plate and the light emission hole. The second plate divides the second chamber into a third chamber and a fourth chamber. The third chamber is located adjacent to the first plate. The fourth chamber is located adjacent to the light emission hole. The second plate includes a second light passage hole that allows passage of the light having passed through the first light passage hole. The first light passage hole, the second light passage hole, and the light emission hole are disposed on a central axis of the LED device. The LED device, the first plate, and the second plate are disposed such that $H/2<S<H$, where H denotes a distance between the LED device and the first plate in a predetermined direction, and S denotes a distance between the first plate and the second plate in the predetermined direction. The predetermined direction is a direction in which the central axis of the LED device extends.

A pointer according to a preferred embodiment of the present invention includes the first light passage hole, the second light passage hole, and the light emission hole that are disposed on the central axis of the LED device. The light from the LED device includes light that travels along the central axis. This light is relatively high in intensity. The high intensity light will be direct light that passes through the first light passage hole, the second light passage hole, and the light emission hole and is then applied to the external space. The direct light thus has high intensity, making the outline of the direct light clearer. The light from the LED device needs to pass through the first light passage hole (which is defined in the first plate) and the second light passage hole (which is defined in the second plate) before being emitted from the light emission hole to the external space. The light from the LED device includes light applied in a direction deviated from the central axis. This light is reflected by the case and the first plate inside the first chamber. Most of the reflected light is unable to pass through the first light passage hole, while a portion of the reflected light passes through the first light passage hole. Accordingly, providing the first plate in the case significantly reduces the amount of reflected light applied to the outside of the case. The reflected light that has passed through the first light passage hole is reflected by the case and the second plate inside the third chamber. Most of the reflected light that has passed through the first light passage hole is unable to pass through the second light passage hole, while only a portion of the reflected light passes through the second light passage hole. Accordingly, providing the second plate in the case further reduces the amount of reflected light applied to the outside of the case.

Assuming that the light from the LED device includes horizontal reflected light reflected first by the case, and vertical reflected light reflected first by the first plate, a change in the location of the second plate results in changes in the proportions of the horizontal reflected light and the vertical reflected light that are able to pass through the second light passage hole. The inventors of preferred embodiments of the present invention have focused on this point. The horizontal reflected light has more difficulty in passing through the first light passage hole and the second light passage hole than the vertical reflected light. The horizontal reflected light, however, includes light that is emitted from the light emission hole to the external space without being attenuated much by, for example, the case. This light may make the outline of the direct light unclear. Based on these findings, the inventors of the preferred embodiments of the present invention have conducted extensive research and discovered that disposing the second plate at a location where H/2<S<H (where H denotes the distance between the LED device and the first plate, and S denotes the distance between the first plate and the second plate) reduces the amount of horizontal reflected light passing through the second light passage hole. The reflected light from the light emission hole to the external space will thus be considerably lower in intensity than the direct light. Consequently, if the reflected light is applied to an area around the direct light applied to a recording medium or a bed on which the recording medium is placed, the outline of the direct light would not be unclear, making it possible to clearly recognize the outline of the direct light.

Various preferred embodiments of the present invention provide pointers that each make the outline of direct light clearer by reducing the amount of reflected light from an LED device inside a case to an external space.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Pointers according to preferred embodiments of the present invention and inkjet printers (hereinafter each referred to as a "printer") that are processing apparatuses including the pointers will be described below with reference to the drawings. The preferred embodiments described below are naturally not intended to limit the present invention in any way. Components or elements having the same functions are identified by the same reference signs, and description thereof will be simplified or omitted when redundant.

Figure 1:
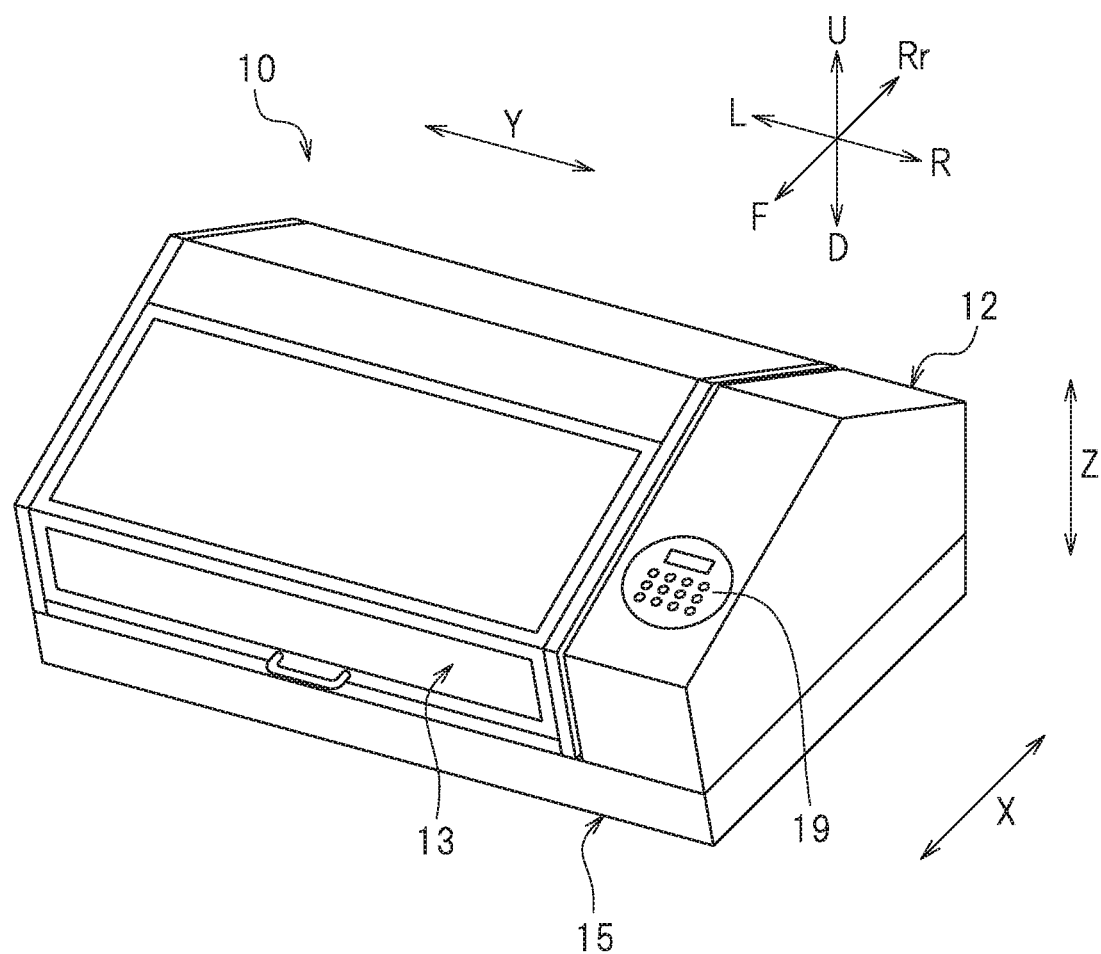
FIG. 1 is a perspective view of a printer according to a preferred embodiment of the present invention.

FIG. 1 is a perspective view of a printer 10 according to a preferred embodiment of the present invention. As used herein, the term "forward" refers to a direction away from the rear of the printer 10 and toward an operator facing the front of the printer 10, and the term "rearward" refers to a direction away from the operator facing the front of the printer 10 and toward the rear of the printer 10. The terms "right", "left", "up", and "down" respectively refer to right, left, up, and down with respect to the operator facing the front of the printer 10. The reference signs F, Rr, R, L, U, and D in the drawings respectively represent front, rear, right, left, up, and down. The reference sign Y in the drawings represents a main scanning direction. In the present preferred embodiment, the main scanning direction Y is a right-left direction. The reference sign X in the drawings represents a sub-scanning direction. In the present preferred embodiment, the sub-scanning direction X is a front-rear direction. The sub-scanning direction X is perpendicular or substantially perpendicular to the main scanning direction Y in a plan view. The reference sign Z in the drawings represents an up-down direction. These directions are defined merely for the sake of convenience of description and do not limit in any way how the printer 10 may be installed or how the present invention may be practiced.

The printer 10 is an inkjet printer. The printer 10 is a "large printer" that is longer in the main scanning direction Y than printers for home use. The printer 10 is, for example, a business-use printer. In the present preferred embodiment, the printer 10 prints an image on a recording medium 5 (see FIG. 2).

The recording medium 5 is, for example, recording paper. The recording medium 5, however, is not limited to recording paper. Examples of the recording medium 5 include: a sheet made of a resin material, such as polyvinyl chloride (PVC) or polyester; and a relatively thick plate, such as a metallic plate made of metal (e.g., aluminum or iron), a glass plate, or a wood plate. The recording medium 5 is an example of an object to be processed (which will hereinafter be referred to as an "object").

Figure 2:
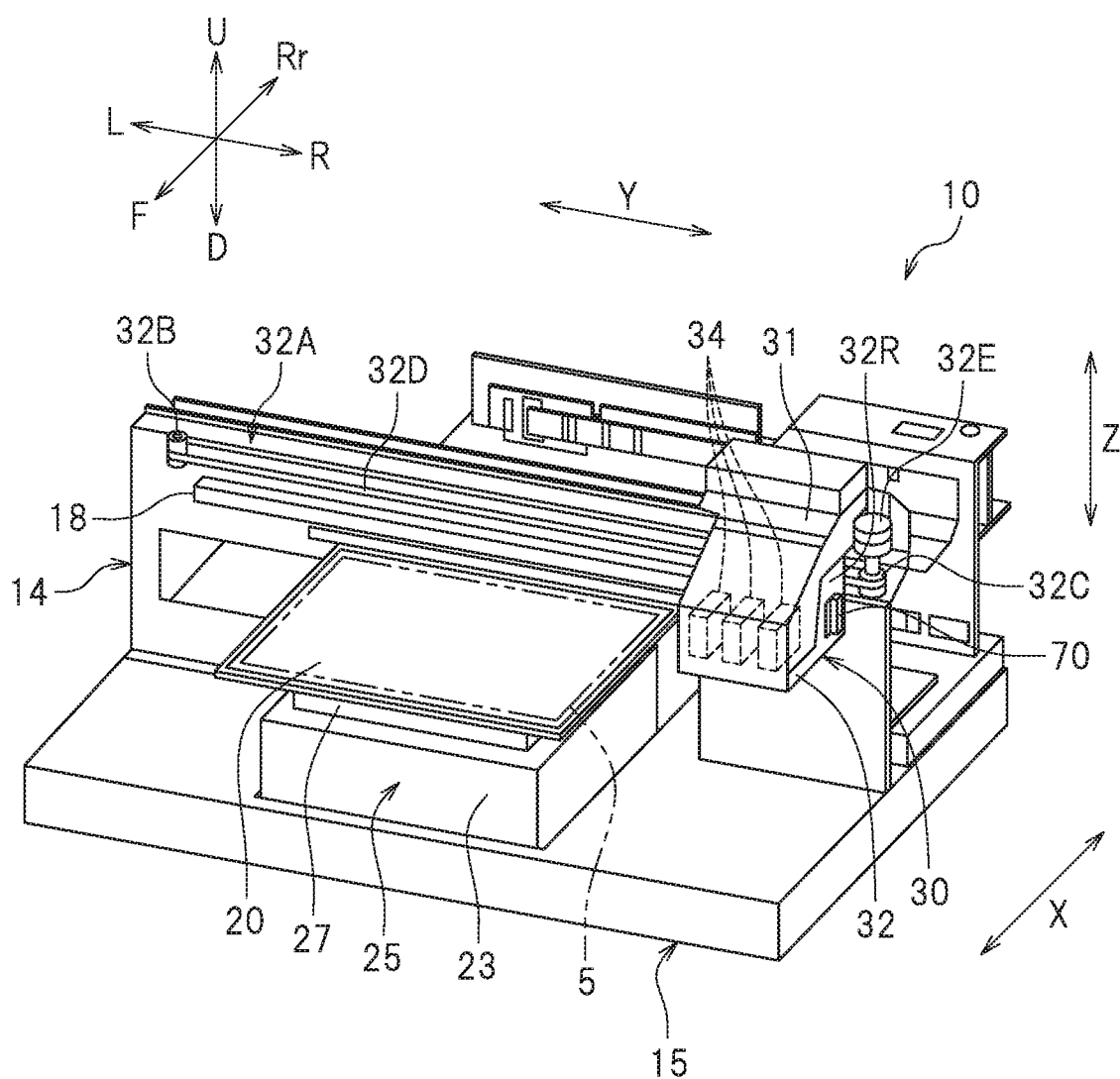
FIG. 2 is a perspective view of the printer according to the present preferred embodiment of the present invention, with its body case removed therefrom.
Figure 3:
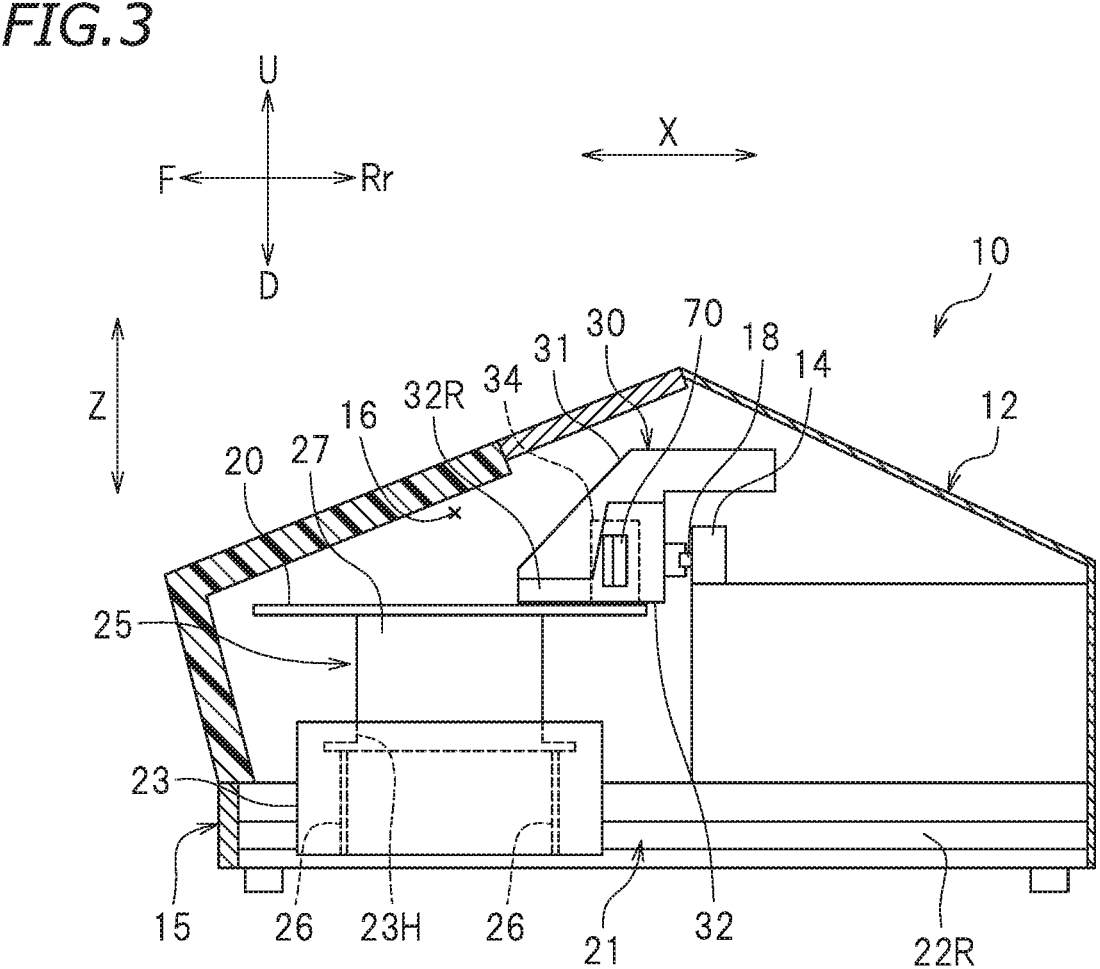
FIG. 3 is a cross-sectional view of the printer according to the present preferred embodiment of the present invention.

As illustrated in FIGS. 1 and 2, the printer 10 includes a body case 12, a support base 15, an operation panel 19, a table 20, an ink head unit 30, and a pointer 70. The table 20 is an example of a bed. The body case 12 has a box shape. The front portion of the body case 12 is provided with a front cover 13. The front cover 13 is able to open and close the body case 12. The support base 15 is attached to the lower portion of the body case 12. The support base 15 supports the body case 12. As illustrated in FIG. 2, the table 20 is disposed above the support base 15. As illustrated in FIG. 3, the ink head unit 30 is disposed inside the body case 12. Specifically, the ink head unit 30 is disposed in an inner space 16 defined by the body case 12 and the support base 15. The ink head unit 30 is disposed above the table 20. The ink head unit 30 includes ink heads 34, a case 31, and a head carriage 32 equipped with the ink heads 34. The head carriage 32 is an example of a carriage.

As illustrated in FIG. 2, the printer 10 includes a body frame 14. The body frame 14 is provided inside the body case 12. The body frame 14 extends in the main scanning direction Y. At least a portion of the body frame 14 is disposed above the table 20. The body frame 14 is supported by the support base 15. The printer 10 includes a guide rail 18. The guide rail 18 is provided on the body frame 14. The guide rail 18 extends in the main scanning direction Y. The guide rail 18 extends along the front surface of the body frame 14. The guide rail 18 is in engagement with the head carriage 32 of the ink head unit 30 such that the head carriage 32 is slidable along the guide rail 18. The head carriage 32 is reciprocated in the main scanning direction Y along the guide rail 18 by a carriage conveyor 32A. The case 31 is attached to the head carriage 32. The carriage conveyor 32A is not limited to any particular configuration or structure. The carriage conveyor 32A includes a left pulley 32B, a right pulley 32C, an endless belt 32D, and a head carriage motor 32E. The left pulley 32B is provided leftward of the left end of the guide rail 18. The right pulley 32C is provided rightward of the right end of the guide rail 18. The belt 32D is wound around the left pulley 32B and the right pulley 32C. The right pulley 32C is connected with the head carriage motor 32E. Alternatively, the head carriage motor 32E may be connected to the left pulley 32B. In the present preferred embodiment, driving the head carriage motor 32E rotates the right pulley 32C so as to cause the belt 32D to run between the left pulley 32B and the right pulley 32C.

As illustrated in FIG. 3, the case 31 is attached to the head carriage 32. The ink heads 34 are housed in the case 31. The ink heads 34 are provided with nozzles (not illustrated). The nozzles of the ink heads 34 discharge ink onto the recording medium 5 placed on the table 20. The ink heads 34 are movable in the main scanning direction Y along the guide rail 18 together with the head carriage 32.

As illustrated in FIG. 2, the recording medium 5 is placed on the table 20. The table 20 has a rectangular shape such that the length of the table 20 measured in the sub-scanning direction X is shorter than the length of the table 20 measured in the main scanning direction Y. Alternatively, the length of the table 20 measured in the sub-scanning direction X may be longer than the length of the table 20 measured in the main scanning direction Y, or the length of the table 20 measured in the sub-scanning direction X may be equal to the length of the table 20 measured in the main scanning direction Y. As illustrated in FIG. 3, the table 20 is disposed below the guide rail 18. The table 20 is disposed below the ink head unit 30. The nozzles (not illustrated) of the ink heads 34 discharge ink onto the recording medium 5 (see FIG. 2) placed on the table 20. The table 20 is movable in the sub-scanning direction X by a first conveyor 21 (which will be described below). The table 20 is movable in the up-down direction Z by a second conveyor 25 (which will be described below).

As illustrated in FIG. 3, the printer 10 includes the first conveyor 21. The first conveyor 21 is housed in the support base 15. The first conveyor 21 includes a right slide rail 22R, a left slide rail (not illustrated), a table carriage 23, and a first driving motor (not illustrated). The right slide rail 22R and the left slide rail are provided in the support base 15. The right slide rail 22R and the left slide rail each extend in the sub-scanning direction X. The right slide rail 22R and the left slide rail guide movement of the table carriage 23 in the sub-scanning direction X. The table carriage 23 is in slidable engagement with the right slide rail 22R and the left slide rail. The table carriage 23 has a box shape. The table carriage 23 is provided with an opening 23H facing upward. The first driving motor is connected to the table carriage 23. Rotating the first driving motor enables the table carriage 23 to move in the sub-scanning direction X along the right slide rail 22R and the left slide rail. The first conveyor 21 is thus able to move the recording medium 5 (which is placed on the table 20) in the sub-scanning direction X.

As illustrated in FIG. 3, the printer 10 includes the second conveyor 25. The second conveyor 25 is housed in the table carriage 23 of the first conveyor 21. The second conveyor 25 includes a plurality of guide columns 26, a support case 27, and a second driving motor (not illustrated). The guide columns 26 extend in the up-down direction Z. The guide columns 26 are provided in the table carriage 23 of the first conveyor 21. The guide columns 26 guide movement of the support case 27 in the up-down direction Z. The support case 27 supports the table 20. The table 20 is secured to the upper portion of the support case 27. The support case 27 is in slidable engagement with the guide columns 26. The support case 27 has a box shape. The support case 27 is movable relative to the table carriage 23 in the up-down direction Z. The second driving motor is connected to the support case 27. Rotating the second driving motor enables the support case 27 to move in the up-down direction Z along the guide columns 26.

As illustrated in FIG. 1, the operation panel 19 is provided on the body case 12. Specifically, the operation panel 19 is provided on the right portion of the body case 12. The operation panel 19 is disposed rightward of the table 20. The operation panel 19 is disposed rightward of the front cover 13. Through the operation panel 19, the operator makes settings and/or enters data for image printing. Although not illustrated in detail, the operation panel 19 includes a display screen and entry button(s). The display screen presents printing-related information, such as a print type, a resolution, a print status, and a print region setting. The entry button(s) is/are used to enter the printing-related information.

Figure 4:
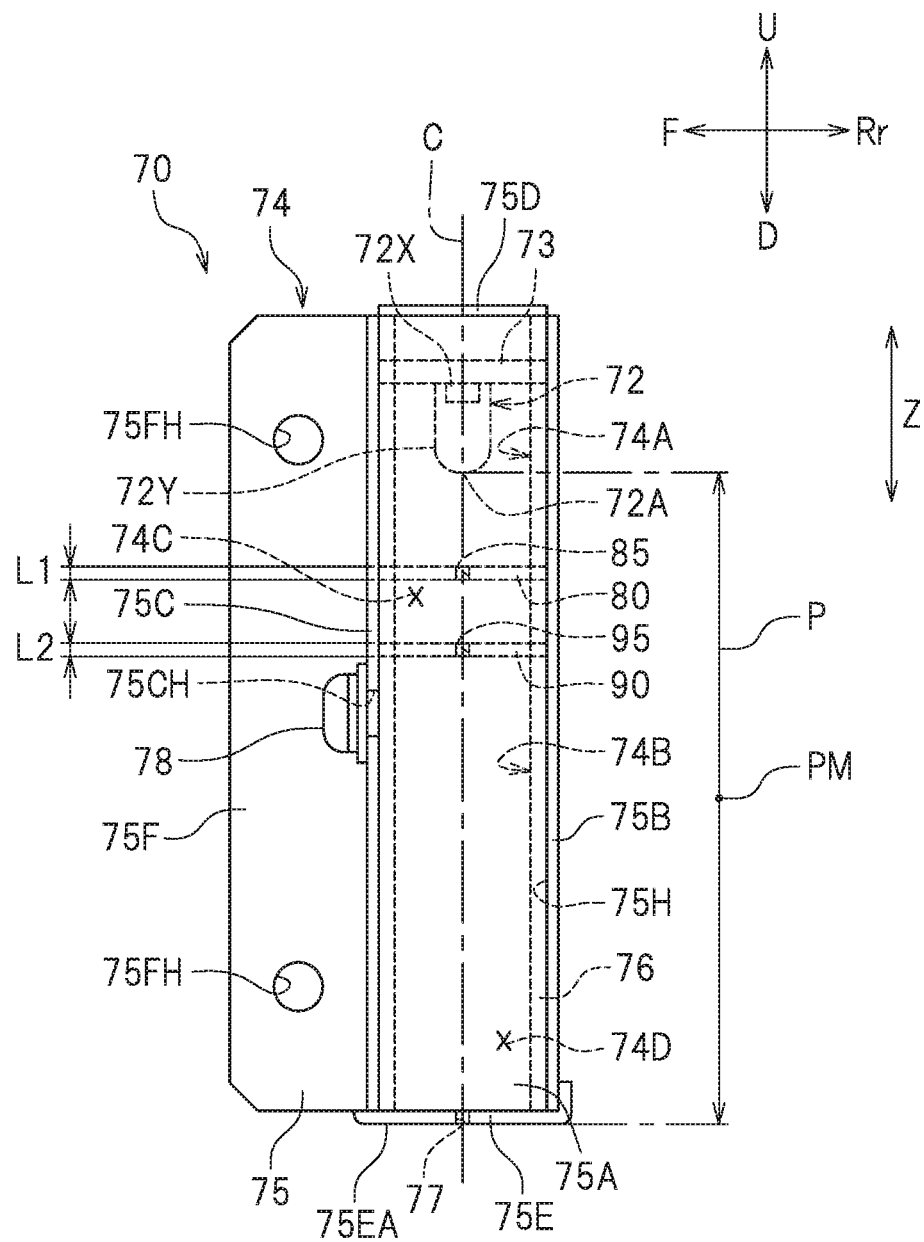
FIG. 4 is a side view of a pointer according to a present preferred embodiment of the present invention.

As illustrated in FIG. 2, the pointer 70 is provided on the ink head unit 30. The pointer 70 is attached to a right side surface 32R (see also FIG. 3) of the head carriage 32. As illustrated in FIG. 3, the pointer 70 is disposed to overlap with the ink heads 34 in a side view (e.g., when viewed in the main scanning direction Y). As illustrated in FIG. 4, the pointer 70 includes a light-emitting diode (LED) device 72, a case 74, a first plate 80, and a second plate 90.

As illustrated in FIG. 4, the LED device 72 is housed in the case 74. The LED device 72 according to the present preferred embodiment includes an LED chip 72X and a lens 72Y covering the LED chip 72X. The LED device 72 is disposed in a first chamber 74A (which will be described below). The LED device 72 is attached to an LED substrate 73. The LED device 72 attached to the LED substrate 73 is further attached to a second case 76 (which will be described below) of the case 74. The LED device applies, for example, red light. In the present preferred embodiment, the LED device 72 is housed in the case 74 such that the LED device 72 applies light downward.

Figure 5:
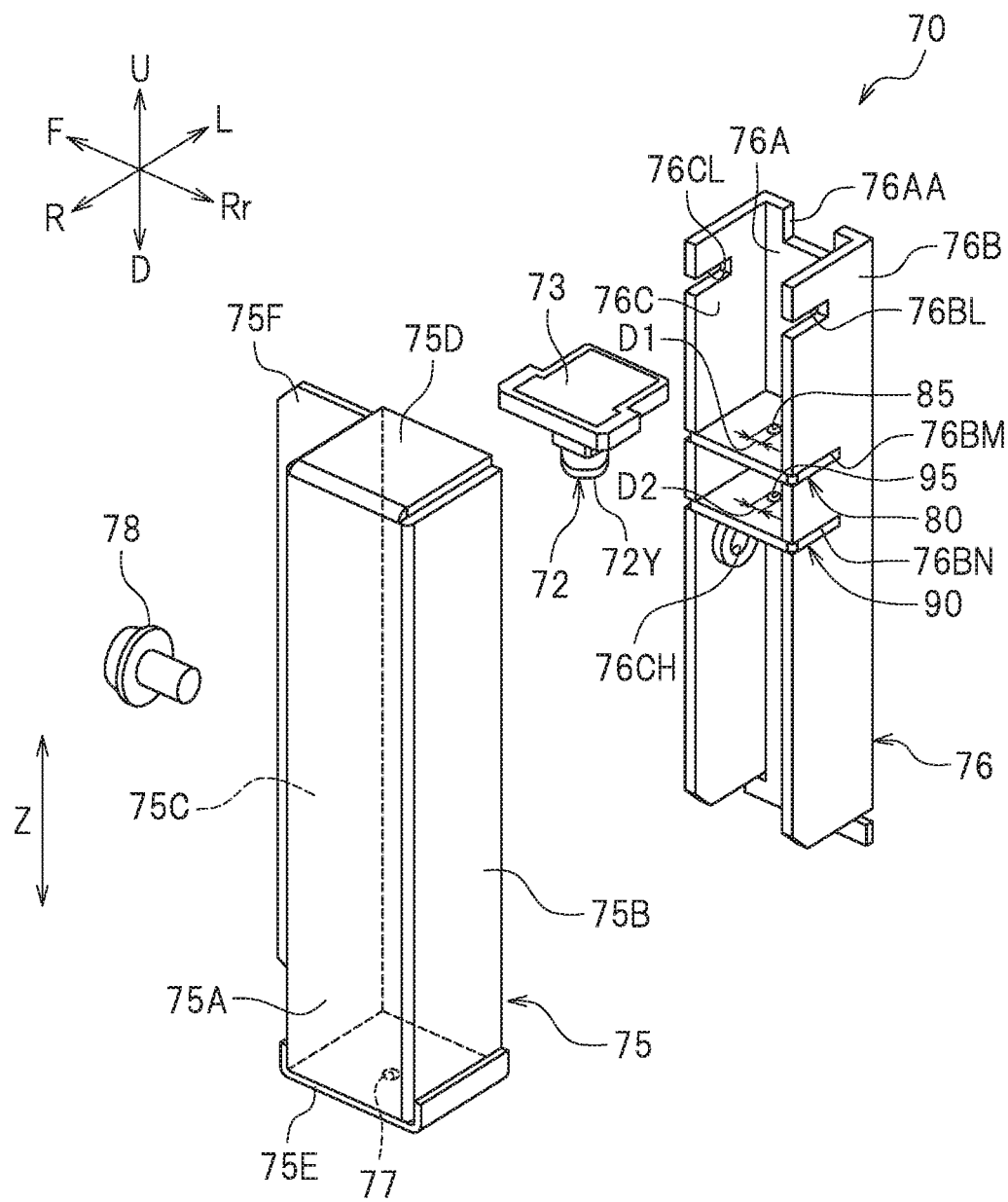
FIG. 5 is an exploded perspective view of the pointer according to the present preferred embodiment of the present invention.

As illustrated in FIG. 4, the case 74 has a cuboid shape. The case 74 extends in the up-down direction Z. As illustrated in FIG. 5, the case 74 includes a first case 75 and the second case 76. The first and second cases 75 and 76 are each made of, for example, aluminum. Alternatively, the first and second cases 75 and 76 may each be made of a metallic material other than aluminum or a resin material.

As illustrated in FIG. 5, the first case 75 includes a bottom wall 75A, a rear wall 75B, a front wall 75C (see FIG. 4), an upper wall 75D, a lower wall 75E (see also FIG. 6), and an extended wall 75F. The bottom wall 75A extends in the up-down direction Z. The rear wall 75B extends leftward from the rear end of the bottom wall 75A. The front wall 75C extends leftward from the front end of the bottom wall 75A. The front wall 75C faces the rear wall 75B. The front wall 75C is provided with a threaded hole 75CH (see FIG. 4). A screw 78 is inserted through the threaded hole 75CH such that the first and second cases 75 and 76 are secured to each other. The upper wall 75D extends leftward from the upper end of the bottom wall 75A. The lower wall 75E extends leftward from the lower end of the bottom wall 75A.

The lower wall 75E faces the upper wall 75D. The lower wall 75E is provided with a light emission hole 77 (see also FIG. 7) through which light from the LED device 72 is emitted to an external space (i.e., to the outside of the case 74). The light emission hole 77 is disposed on a central axis C (see FIGS. 4 and 6) of the LED device 72. The lower wall 75E is an example of a base plate. The bottom wall 75A, the rear wall 75B, the front wall 75C, the upper wall 75D, and the lower wall 75E define an opening 75H. The second case 76 is inserted into the opening 75H. The extended wall 75F extends forward from the left end of the front wall 75C. The extended wall 75F is provided with through holes 75FH (see FIG. 4). Screws (not illustrated), for example, are inserted through the through holes 75FH so as to secure the case 74 to the head carriage 32 of the ink head unit 30 (see FIG. 2).

As illustrated in FIG. 5, the second case 76 includes a bottom wall 76A, a rear wall 76B, and a front wall 76C. The bottom wall 76A extends in the up-down direction Z. With the first and second cases 75 and 76 secured to each other, the bottom wall 76A of the second case 76 faces the bottom wall 75A of the first case 75. The upper portion of the bottom wall 76A is provided with a cut-out 76AA that allows passage of wiring (not illustrated) connected to the LED substrate 73.

As illustrated in FIG. 5, the rear wall 76B extends rightward from the rear end of the bottom wall 76A. With the first and second cases 75 and 76 secured to each other, the rear wall 76B of the second case 76 overlaps with the rear wall 75B of the first case 75. The rear wall 76B of the second case 76 is provided with a first engagement groove 76BL in engagement with the LED substrate 73. The first engagement groove 76BL is recessed from the right end of the rear wall 76B toward the left end of the rear wall 76B. The rear wall 76B is provided with a second engagement groove 76BM in engagement with the first plate 80. The second engagement groove 76BM is recessed from the right end of the rear wall 76B toward the left end of the rear wall 76B. The second engagement groove 76BM is located below the first engagement groove 76BL. The rear wall 76B is provided with a third engagement groove 76BN in engagement with the second plate 90. The third engagement groove 76BN is recessed from the right end of the rear wall 76B toward the left end of the rear wall 76B. The third engagement groove 76BN is located below the second engagement groove 76BM.

As illustrated in FIG. 5, the front wall 76C extends rightward from the front end of the bottom wall 76A. The front wall 76C faces the rear wall 76B. With the first and second cases 75 and 76 secured to each other, the front wall 76C of the second case 76 overlaps with the front wall 75C of the first case 75. The front wall 76C is provided with a first engagement groove 76CL in engagement with the LED substrate 73. The first engagement groove 76CL is recessed from the right end of the front wall 76C toward the left end of the front wall 76C. The front wall 76C is provided with a second engagement groove 76CM (see FIG. 6) in engagement with the first plate 80. The second engagement groove 76CM is recessed from the right end of the front wall 76C toward the left end of the front wall 76C. The second engagement groove 76CM is located below the first engagement groove 76CL. The front wall 76C is provided with a third engagement groove 76CN (see FIG. 6) in engagement with the second plate 90. The third engagement groove 76CN is recessed from the right end of the front wall 76C toward the left end of the front wall 76C. The third engagement groove 76CN is located below the second engagement groove 76CM. The front wall 76C is provided with a threaded hole 76CH. The screw 78 is inserted through the threaded hole 76CH such that the first and second cases 75 and 76 are secured to each other. With the second case 76 inserted into the opening 75H of the first case 75, the threaded hole 76CH of the second case 76 overlaps with the threaded hole 75CH of the first case 75. The threaded hole 76CH is located below the third engagement groove 76CN.

Figure 6:
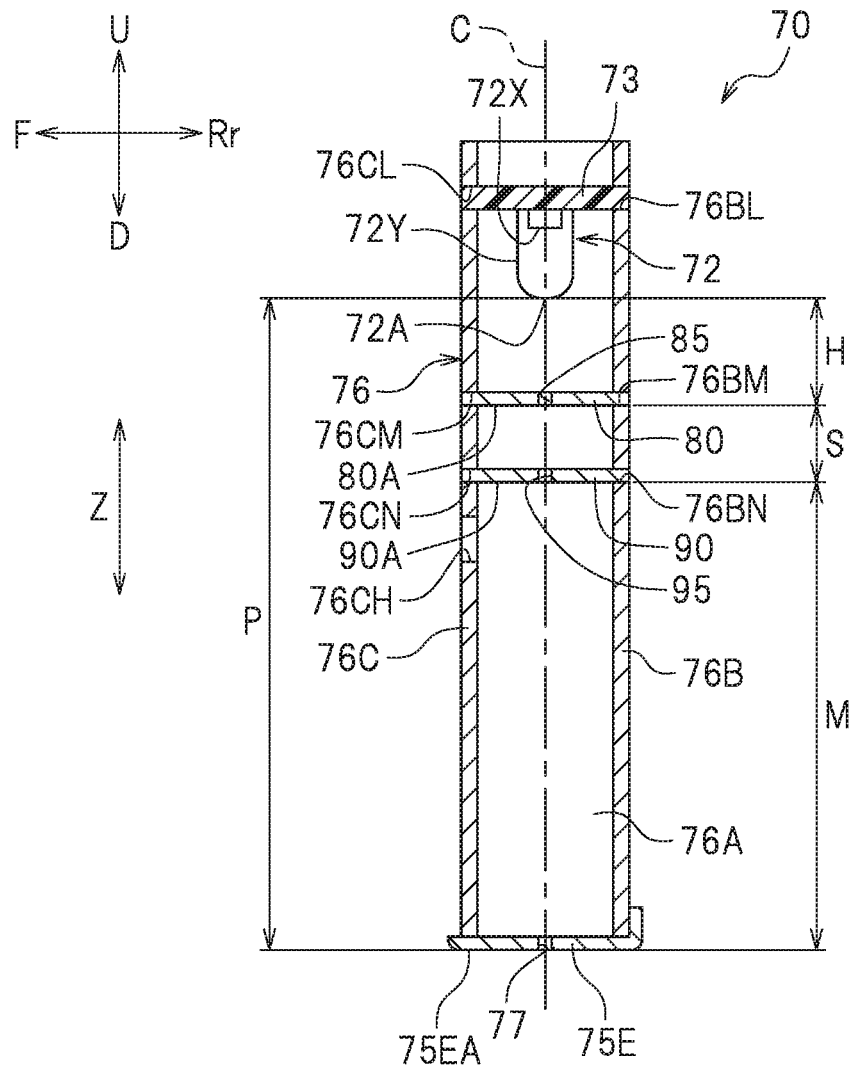
FIG. 6 is a cross-sectional view of a portion of the pointer according to the present preferred embodiment of the present invention.
Figure 7:
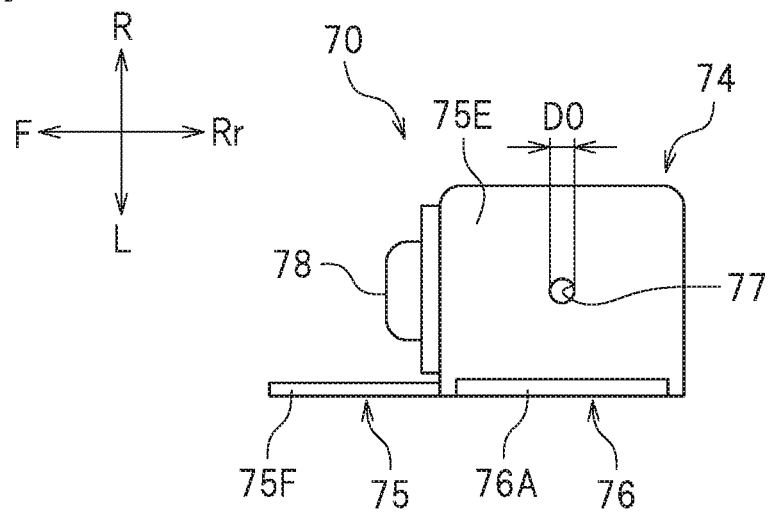
FIG. 7 is a bottom view of the pointer according to the present preferred embodiment of the present invention.

As illustrated in FIG. 4, the first plate 80 is disposed in the case 74. As illustrated in FIG. 6, the first plate 80 is in engagement with the second engagement grooves 76BM and 76CM of the second case 76. As illustrated in FIG. 4, the first plate 80 is disposed between the LED device 72 and the light emission hole 77. The first plate 80 is disposed below the LED device 72. The first plate 80 is disposed above the light emission hole 77. The first plate 80 is disposed above the second plate 90. The first plate 80 is located closer to the LED device 72 than an intermediate position PM. The intermediate position PM is located in the middle of a distance P between the LED device 72 and the light emission hole 77. In the present preferred embodiment, the intermediate position PM is located in the middle of the distance P between a lower end 72A of the LED device 72 and a lower end of the light emission hole 77 (which is flush with a lower surface 75EA of the lower wall 75E) in the up-down direction Z. The first plate 80 is located above the intermediate position PM. The first plate 80 divides the case 74 into the first chamber 74A and a second chamber 74B. The LED device 72 is housed in the first chamber 74A. The second chamber 74B is in communication with the light emission hole 77. The first plate 80 is provided with a first light passage hole 85. The light from the LED device 72 passes through the first light passage hole 85. The first light passage hole 85 has a diameter D1 (see FIG. 5). The light emission hole 77 has a diameter D0 (see FIG. 7). The diameter D1 of the first light passage hole 85 is larger than the diameter D0 of the light emission hole 77. In one example, the diameters D1 and D0 are set such that D1> about 1.5D0. The first light passage hole 85 is disposed on the central axis C of the LED device 72. The first plate 80 is made of, for example, aluminum.

As illustrated in FIG. 4, the second plate 90 is disposed in the case 74. Specifically, the second plate 90 is disposed in the second chamber 74B. As illustrated in FIG. 6, the second plate 90 is in engagement with the third engagement grooves 76BN and 76CN of the second case 76. As illustrated in FIG. 4, the second plate 90 is disposed between the first plate 80 and the light emission hole 77. The second plate 90 is disposed below the LED device 72. The second plate 90 is disposed above the light emission hole 77. The second plate 90 is disposed below the first plate 80. The second plate 90 is located closer to the LED device 72 than the intermediate position PM between the LED device 72 and the light emission hole 77. The second plate 90 is located above the intermediate position PM. The second plate 90 divides the second chamber 74B into a third chamber 74C and a fourth chamber 74D. The third chamber 74C is located adjacent to the first plate 80. The fourth chamber 74D is located adjacent to the light emission hole 77. The third chamber 74C is in communication with the first light passage hole 85. The fourth chamber 74D is in communication with the light emission hole 77. The second plate 90 is provided with a second light passage hole 95. Light that has passed through the first light passage hole 85 then passes through the second light passage hole 95. The second light passage hole 95 has a diameter D2 (see FIG. 5). The diameter D2 of the second light passage hole 95 is larger than the diameter D0 (see FIG. 7) of the light emission hole 77. In one example, the diameters D2 and D0 are set such that D2> about 1.5D0. In the present preferred embodiment, the diameter D2 of the second light passage hole 95 is equal to the diameter D1 of the first light passage hole 85. The second light passage hole 95 is disposed on the central axis C of the LED device 72. In the present preferred embodiment, the first plate 80 has a thickness L1, and the second plate 90 has a thickness L2. The thickness L2 of the second plate 90 is equal to the thickness L1 of the first plate 80. In other words, the length of the second plate 90 measured in the up-down direction Z is equal to the length of the first plate 80 measured in the up-down direction Z. Alternatively, the thickness L2 of the second plate 90 may be larger than the thickness L1 of the first plate 80. The second plate 90 is made of, for example, aluminum.

As illustrated in FIG. 6, the LED device 72 and the first plate 80 have a distance H therebetween in the up-down direction Z, and the first plate 80 and the second plate 90 have a distance S therebetween in the up-down direction Z. The LED device 72, the first plate 80, and the second plate 90 are disposed such that H/2<S<H. As used herein, the term "up-down direction Z" refers to a direction in which the central axis C of the LED device 72 extends. In the present preferred embodiment, the distance H is measured between the lower end 72A of the LED device 72 and a lower surface 80A of the first plate 80 in the up-down direction Z, and the distance S is measured between the lower surface 80A of the first plate 80 and a lower surface 90A of the second plate 90 in the up-down direction Z. The second plate 90 and the lower wall 75E of the first case 75 have a distance M therebetween in the up-down direction Z. The LED device 72, the first plate 80, the second plate 90, and the lower wall 75E are disposed such that 2(H+S)<M. In the present preferred embodiment, the distance M is measured between the lower surface 90A of the second plate 90 and the lower surface 75EA of the lower wall 75E in the up-down direction Z.

Figure 8:
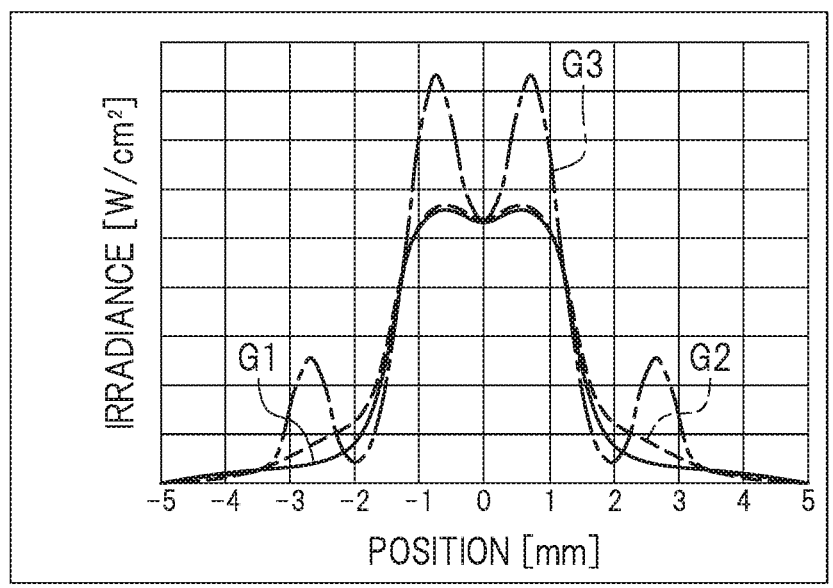
FIG. 8 is an exemplary graph illustrating the relationship between irradiance and positions.
Figure 9:
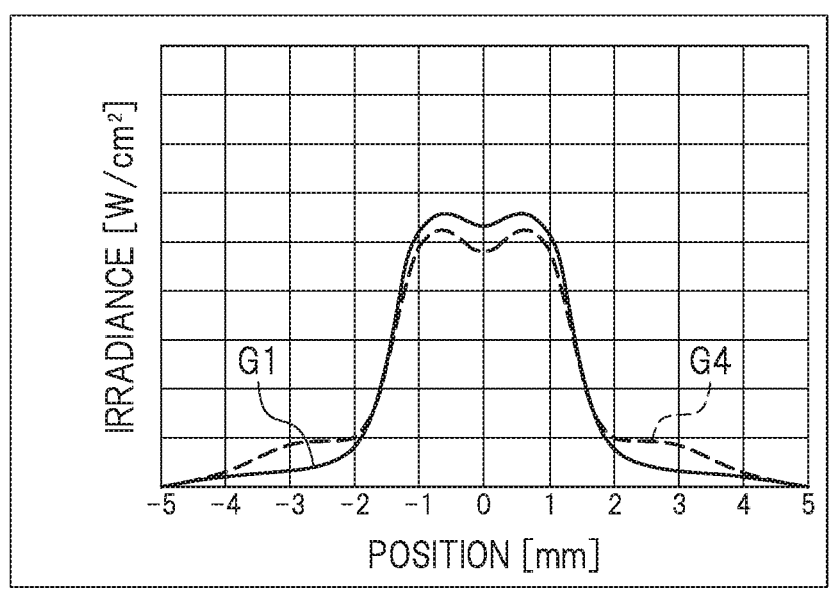
FIG. 9 is another exemplary graph illustrating the relationship between irradiance and positions.

FIGS. 8 and 9 each illustrate the relationship between irradiance (expressed in units of $W/cm^2$) of light from the light emission hole 77 to the external space and positions (expressed in units of mm) on a surface to which the light is applied (hereinafter referred to as a "target surface") when the distance S is changed, with the distances H and P kept constant. In the example illustrated in each of FIGS. 8 and 9, the irradiance of the light is expressed in units of $W/cm^2$ for the distance S, assuming that the distance P (see FIG. 4) is about 47.3 mm, the distance H (see FIG. 6) is about 7.5 mm, the distance between the light emission hole 77 and the target surface (e.g., a surface of the recording medium 5 or a surface of the table 20) is about 20 mm, the diameter D1 of the first light passage hole 85 is about 1.7 mm, the diameter D2 of the second light passage hole 95 is about 1.7 mm, and the diameter D0 of the light emission hole 77 is about 1 mm. In each of FIGS. 8 and 9, the vertical axis represents the light irradiance (expressed in units of $W/cm^2$), and the horizontal axis represents positions (expressed in units of mm) on the target surface that are horizontally deviated from the central axis C of the LED device 72. The position where the central axis C of the LED device 72 passes through is 0. In FIG. 8, a graph G1 indicated by a solid line represents the light irradiance when the distance S is about 5.7 mm (i.e., when H/2<S<H), a graph G2 indicated by a broken line represents the light irradiance when the distance S is about 2.8 mm (i.e., when S<H/2), and a graph G3 indicated by an alternate long and short dash line represents the light irradiance when the distance S is about 9.8 mm (i.e., when H<S). In FIG. 9, the graph G1 indicated by the solid line represents the light irradiance when the distance S is about 5.7 mm, and a graph G4 indicated by a broken line represents the light irradiance when the distance S is about 27.4 mm (i.e., when 3H<S).

As illustrated in FIG. 8, substantially the same irradiance is indicated by the graphs G1, G2, and G3 at the position "0 mm". This suggests that the irradiance of direct light from the LED device 72 would be substantially the same if the distance S is changed. The irradiance indicated by the graph G3, however, is considerably high at positions close to about +1 mm and positions close to about −1 mm, suggesting that reflected light from the LED device 72 is higher in irradiance than the direct light from the LED device 72. This proves that when a pointer applies reflected light with irradiance indicated by the graph G3, the reflected light will make the outline of the direct light very unclear. The irradiance indicated by the graph G2 is higher than the irradiance indicated by the graph G1 at positions within the range of about +2 mm to about +3 mm and positions within the range of about −2 mm to about −3 mm, suggesting that reflected light with irradiance indicated by the graph G2 will make the outline of the direct light slightly unclear. As illustrated in FIG. 9, the irradiance indicated by the graph G4 is higher than the irradiance indicated by the graph G1 at positions within the range of about +2 mm to about +4 mm and positions within the range of about −2 mm to about −4 mm, suggesting that reflected light with irradiance indicated by the graph G4 will make the outline of the direct light slightly unclear. FIGS. 8 and 9 thus prove that the outline of the direct light from the LED device 72 is clearest when the LED device 72, the first plate 80, and the second plate 90 are disposed such that H/2<S<H.

As described above, the pointer 70 according to the present preferred embodiment includes the first light passage hole 85, the second light passage hole 95, and the light emission hole 77 that are disposed on the central axis C of the LED device 72. The light from the LED device 72 includes light that travels along the central axis C. This light is relatively high in intensity. The high intensity light will be direct light that passes through the first light passage hole 85, the second light passage hole 95, and the light emission hole 77 and is then applied to the external space. The direct light thus has high intensity, making the outline of the direct light clearer. The light from the LED device 72 needs to pass through the first light passage hole 85 (which is defined in the first plate 80) and the second light passage hole 95 (which is defined in the second plate 90) before being emitted from the light emission hole 77 to the external space. The light from the LED device 72 includes light applied in a direction deviated from the central axis C. This light is reflected by the case 74 and the first plate 80 inside the first chamber 74A. Most of the reflected light is unable to pass through the first light passage hole 85, while a portion of the reflected light passes through the first light passage hole 85. Accordingly, providing the first plate 80 in the case 74 significantly reduces the amount of reflected light applied to the outside of the case 74. The reflected light that has passed through the first light passage hole 85 is then reflected by the case 74 and the second plate 90 inside the third chamber 74C. Most of the reflected light that has passed through the first light passage hole 85 is unable to pass through the second light passage hole 95, while only a portion of the reflected light passes through the second light passage hole 95. Accordingly, providing the second plate 90 in the case 74 further reduces the amount of reflected light applied to the outside of the case 74.

Assuming that the light from the LED device 72 includes horizontal reflected light reflected first by the case 74, and vertical reflected light reflected first by the first plate 80, a change in the location of the second plate 90 results in changes in the proportions of the horizontal reflected light and the vertical reflected light that are able to pass through the second light passage hole 95. The inventors of preferred embodiments of the present invention have focused on this point. The horizontal reflected light has more difficulty in passing through the first light passage hole 85 and the second light passage hole 95 than the vertical reflected light. The horizontal reflected light, however, includes light that is emitted from the light emission hole 77 to the external space without being attenuated much by, for example, the case 74. This light may make the outline of the direct light unclear. Based on these findings, the inventors of the present invention have conducted extensive research and found that disposing the second plate 90 at a location where H/2<S<H (where H denotes the distance between the LED device 72 and the first plate 80 in the up-down direction Z, and S denotes the distance between the first plate 80 and the second plate 90 in the up-down direction Z) reduces the amount of horizontal reflected light passing through the second light passage hole 95. The reflected light from the light emission hole 77 to the external space will thus be considerably lower in intensity than the direct light. Consequently, if the reflected light is applied to an area around the direct light applied to the recording medium 5 or the table 20 on which the recording medium 5 is placed, the outline of the direct light would not be unclear, making it possible to clearly recognize the outline of the direct light.

The pointer 70 according to the present preferred embodiment is configured such that the diameter D1 of the first light passage hole 85 and the diameter D2 of the second light passage hole 95 are each larger than the diameter D0 of the light emission hole 77. The direct light from the LED device 72 will thus not be blocked by the first plate 80 when passing through the first light passage hole 85 or by the second plate 90 when passing through the second light passage hole 95. Consequently, the direct light guided into the light emission hole 77 will not be weakened.

The pointer 70 according to the present preferred embodiment is configured such that the diameter D1 of the first light passage hole 85 is equal to the diameter D2 of the second light passage hole 95. This prevents the direct light, which has passed through the first light passage hole 85, from being blocked by the second plate 90, while reducing the amount of reflected light that passes through the second light passage hole 95.

The pointer 70 according to the present preferred embodiment includes the second plate 90 located closer to the LED device 72 than the intermediate position PM between the LED device 72 and the light emission hole 77 in the up-down direction Z. The reflected light (in particular, the vertical reflected light) that has passed through the second light passage hole 95 is thus further attenuated before being emitted from the light emission hole 77 to the external space.

The pointer 70 according to the present preferred embodiment is configured such 2(H+S)<M (where M denotes the distance between the second plate 90 and the lower wall 75E of the first case 75 in the up-down direction Z). The reflected light (in particular, the vertical reflected light) that has passed through the second light passage hole 95 is thus further attenuated before being emitted from the light emission hole 77 to the external space.

The pointer 70 according to the present preferred embodiment includes the second plate 90 that may have the thickness L2 larger than the thickness L1 of the first plate 80. If the thickness L2 of the second plate 90 is small, the reflected light may pass through the second light passage hole 95. Making the thickness L2 of the second plate 90 larger than the thickness L1 of the first plate 80, however, causes the second plate 90 to attenuate and/or reflect the reflected light passing through the second light passage hole 95. This further reduces the amount of reflected light that passes through the second light passage hole 95.

The pointer 70 according to the present preferred embodiment includes the case 74 having a cuboid shape. Accordingly, the case 74 has a simple structure and is thus easily attached to, for example, the head carriage 32 or the case 31 of the ink head unit 30.

Although preferred embodiments of the present invention has been described thus far, the preferred embodiments described above are only illustrative. The present invention may be embodied in various other forms.

The foregoing preferred embodiments involve determining a suitable range of the distance S in accordance with the distance H. The suitable range of the distance S may be determined in any other manner. The suitable range of the distance S may be determined in accordance with, for example, the distance H and the diameter D1 of the first light passage hole 85. In this case, the distance S is preferably determined such that S=(2H+D1)/4.

In the foregoing preferred embodiments, the LED device includes the single LED chip 72X. Alternatively, the LED device 72 may include any other number of LED chips. The LED device 72 may include two or more LED chips (e.g., a red LED chip, a green LED chip, and a blue LED chip). This makes it possible to select a suitable color for the direct light to be applied from the pointer 70, such that the direct light applied to the recording medium 5 or the table 20 is easily recognizable. For example, suppose that the color of the recording medium 5 is red, and the color of the light emitted from the LED chip 72X of the LED device 72 is red. In such a case, the outline of the direct light will be unclear on the recording medium 5, making it difficult to recognize the direct light. A solution to this problem involves changing the color of the direct light (which is to be applied from the pointer 70) to white or blue such that the outline of the direct light will be clear on the recording medium 5. This enables the operator to easily recognize the direct light. In one example, the color of the recording medium 5 or the table 20 and the color of the direct light to be applied from the LED device 72 are preferably complementary to each other. In this case, when the color of the recording medium 5 is blue, the color of the direct light is preferably yellow. In another example, the color of the direct light to be applied from the LED device is preferably reverse in brightness to the color of the recording medium 5 or the table 20. In this case, when the color of the recording medium 5 is black, the color of the direct light is preferably white. The printer 10 may include a controller that is able to change the color of the direct light to a color easily recognizable to the operator while actually applying the direct light from the pointer 70 to the recording medium 5 or the table 20. The LED device 72 may include a point source LED chip. The color of light from the point source LED chip is, for example, red.

In the foregoing preferred embodiments, the case 74 has a cuboid shape. The case 74, however, may have any other suitable shape. The case 74 may have, for example, a cylindrical shape.

In the foregoing preferred embodiments, the table 20 is moved relative to the ink heads 34 in the sub-scanning direction X. The table 20, however, may be moved in any other suitable manner. In one example, the table 20 may be secured to the support base 15, and the ink heads 34 may be moved relative to the table 20 in the sub-scanning direction X.

In the foregoing preferred embodiments, the table 20 is moved relative to the ink heads 34 in the up-down direction Z. The table 20, however, may be moved in any other suitable manner. In one example, the table 20 may be secured to the support base 15, and the ink heads 34 may be moved relative to the table 20 in the up-down direction Z.

The techniques disclosed herein are usable for various types of printers. The techniques disclosed herein are usable not only for the printer 10 of a flatbed type illustrated in the foregoing preferred embodiments but also for the printer 10 of a "roll-to-roll" type in which the recording medium 5 in a rolled form, for example, is conveyed in the sub-scanning direction X.

The foregoing preferred embodiments has been described on the assumption that a processing apparatus to which the present invention is applied is the printer 10 equipped with the pointer 70. Preferred embodiments of the present invention, however, may be applied to any other processing apparatuses. Examples of processing apparatuses to which preferred embodiments of the present invention is applicable include: a cutter to cut an object into a desired shape; a stamping press to transfer foil to an object; a cutting apparatus to cut an object so as to machine the object into a desired shape; an embroidering apparatus to decorate an object using an embroidery thread and an embroidery needle; and a three-dimensional printing apparatus to form an object into a three-dimensional object having a desired shape.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pointer comprising:
   an LED device;
   a case housing the LED device and including a light emission hole through which light from the LED device is emitted to an external space;
   a first plate disposed in the case such that the first plate is located between the LED device and the light emission hole, the first plate dividing the case into a first chamber and a second chamber, the first chamber housing the LED device, the second chamber being in communication with the light emission hole, the first plate including a first light passage hole that allows passage of the light from the LED device; and
   a second plate disposed in the second chamber such that the second plate is located between the first plate and the light emission hole, the second plate dividing the second chamber into a third chamber and a fourth chamber, the third chamber being located adjacent to the first plate, the fourth chamber being located adjacent to the light emission hole, the second plate including a second light passage hole that allows passage of the light having passed through the first light passage hole; wherein the first light passage hole, the second light passage hole, and the light emission hole are located on a central axis of the LED device; and
   the LED device, the first plate, and the second plate are located such that $H/2<S<H$, where H denotes a distance between the LED device and the first plate in a predetermined direction, and S denotes a distance between the first plate and the second plate in the predetermined direction, the predetermined direction being a direction in which the central axis of the LED device extends.

2. The pointer according to claim 1, wherein a diameter of the first light passage hole and a diameter of the second light passage hole are each larger than a diameter of the light emission hole.

3. The pointer according to claim 2, wherein the diameter of the first light passage hole is equal to the diameter of the second light passage hole.

4. The pointer according to claim 1, wherein the second plate is located closer to the LED device than an intermediate position between the LED device and the light emission hole in the predetermined direction.

5. The pointer according to claim 4, wherein
   the case includes a base plate in which the light emission hole is defined; and
   the LED device, the first plate, the second plate, and the base plate are disposed such that $2(H+S)<M$, where M denotes a distance between the second plate and the base plate in the predetermined direction.

6. The pointer according to claim 1, wherein a thickness of the second plate is larger than a thickness of the first plate.

7. The pointer according to claim 1, wherein the case has a cuboid shape.

8. The pointer according to claim 1, wherein the case has a cylindrical shape.

9. The pointer according to claim 1, wherein the LED device includes a plurality of LED chips to emit light of different colors.

10. The pointer according to claim 1, wherein the LED device includes a point source LED chip.

11. An inkjet printer comprising:
    the pointer according to claim 1;
    a bed on which a recording medium is to be placed;
    an ink head disposed above the bed to discharge ink onto the recording medium placed on the bed; and
    a carriage equipped with the ink head and the pointer, the carriage being movable in a main scanning direction.

* * * * *